(12) United States Patent
Brunet et al.

(10) Patent No.: US 11,440,433 B2
(45) Date of Patent: Sep. 13, 2022

(54) METHOD FOR DETERMINING A STATE-OF-CHARGE OPERATING WINDOW OF A BATTERY

(71) Applicant: VOLVO TRUCK CORPORATION, Gothenburg (SE)

(72) Inventors: Simon Brunet, Landvetter (SE); Tobias Smidebrant, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 16/954,244

(22) PCT Filed: Dec. 20, 2018

(86) PCT No.: PCT/EP2018/086314
§ 371 (c)(1),
(2) Date: Jun. 16, 2020

(87) PCT Pub. No.: WO2019/122198
PCT Pub. Date: Jun. 27, 2019

(65) Prior Publication Data
US 2020/0406782 A1  Dec. 31, 2020

(30) Foreign Application Priority Data

Dec. 22, 2017 (WO) .................. PCT/EP2017/084444

(51) Int. Cl.
*B60L 58/13* (2019.01)
*B60L 58/18* (2019.01)

(52) U.S. Cl.
CPC ............... *B60L 58/13* (2019.02); *B60L 58/18* (2019.02); *B60L 2200/18* (2013.01)

(58) Field of Classification Search
None
See application file for complete search history.

(56) References Cited

U.S. PATENT DOCUMENTS

| 2007/0262750 | A1  | 11/2007 | Yun et al. |
| 2008/0048619 | A1* | 2/2008  | Yoshida ............... B60L 3/0038 320/134 |

(Continued)

FOREIGN PATENT DOCUMENTS

| EP | 2340960 A2 | 7/2011 |
| EP | 2502774 A1 | 9/2012 |

(Continued)

OTHER PUBLICATIONS

International Search Report and Written Opinion dated Feb. 4, 2019 in corresponding International PCT Application No. PCT/EP2018/086314, 10 pages.

(Continued)

*Primary Examiner* — Pinping Sun
*Assistant Examiner* — Joel Barnett
(74) *Attorney, Agent, or Firm* — Venable LLP; Jeffri A. Kaminski

(57) ABSTRACT

The invention relates to a method (100) for determining an adjusted state-of-charge (SOC) operating window of a battery pack assembly in a vehicle. The method comprises the steps of determining (120) an energy throughput or an electrical current through put of the battery pack assembly; determining (130) a SOC operating window margin based on said determined energy throughput or electrical current through put of the battery pack assembly;adjusting (140) the SOC operating window in response to the determined SOC operating window margin.

16 Claims, 3 Drawing Sheets

(56) References Cited

U.S. PATENT DOCUMENTS

| | | | |
|---|---|---|---|
| 2011/0156652 A1* | 6/2011 | Kishiyama | B60L 53/11 320/132 |
| 2012/0283902 A1* | 11/2012 | Kusumi | B60L 53/14 701/22 |
| 2013/0027048 A1* | 1/2013 | Schwarz | B60L 50/66 324/427 |
| 2015/0105947 A1 | 4/2015 | Chang et al. | |
| 2015/0105948 A1 | 4/2015 | Chang et al. | |
| 2015/0191098 A1 | 7/2015 | Chang et al. | |
| 2015/0306971 A1* | 10/2015 | Chang | H02J 7/1461 701/22 |
| 2016/0146898 A1* | 5/2016 | Lennevi | B60L 3/12 324/426 |
| 2016/0318416 A1 | 11/2016 | Kamatani et al. | |

FOREIGN PATENT DOCUMENTS

| | | |
|---|---|---|
| KR | 101742737 B1 | 6/2017 |
| WO | 2014202172 A2 | 12/2014 |
| WO | 2015124161 A1 | 8/2015 |

OTHER PUBLICATIONS

Martin Sivertsson & Lars Eriksson, "Design and evaluation of energy management using map-based ECMS for the PHEV benchmark", Vehicular Systems, Department of Electrical Engineering, Linköping University, SE-581 83 Linköping Sweden, pp. 257-286, Retrieved from http://ogst.ifpenergiesnouvelles.fr, (DOI): 10:2516/ogst/2014018.

* cited by examiner

METHOD FOR DETERMINING A STATE-OF-CHARGE OPERATING WINDOW OF A BATTERY

CROSS-REFERENCE TO RELATED APPLICATIONS

This application is a U.S. National Stage application of PCT/EP2018/086314, filed Dec. 20, 2018, and published on Jun. 27, 2019, as WO 2019/122198 A1, which claims priority to PCT/EP2017/084444, filed Dec. 22, 2017, all of which are hereby incorporated by reference in their entirety.

TECHNICAL FIELD

The invention relates to a method for determining an adjusted state-of-charge (SOC) operating window of a battery pack assembly in a vehicle. Moreover, the invention relates to a method of controlling a vehicle electrical system based on an adjusted state-of-charge (SOC) operating window of a battery pack assembly in a vehicle. The invention also relates to a vehicle comprising a control unit for performing a method of determining an adjusted state-of-charge (SOC) operating window of a battery pack assembly. The invention further relates to a vehicle comprising a control unit for performing a method of controlling a vehicle electrical system by an adjusted state-of-charge (SOC) operating window of a battery pack assembly.

The invention can be applied in any type of hybrid vehicles or electrical vehicles, such as partly or fully electrical vehicles. Although the invention will be described with respect to an electrical bus, the invention is not restricted to this particular vehicle, but may also be used in other hybrid or electrical vehicles such as electrical trucks, electrical construction equipment, and electrical cars. The invention may also be applied in any other type of electrical vehicle such as electrical powered construction equipment, electrical powered working machines e.g. wheel loaders, articulated haulers, dump trucks, excavators and backhoe loaders etc.

BACKGROUND

Batteries are becoming a more common source of power for providing propulsion for vehicles. Such batteries are often rechargeable batteries and typically include a number of battery cells that may be connected in series and/or in parallel forming a complete battery pack for the vehicle. Typically, a battery pack includes a number of battery cells. The quality of the battery pack is highly dependent on the quality of each battery cell, thereby setting strict requirements on the production quality of the battery cells. However, the battery cells may nevertheless have somewhat different capacities despite the high quality and may also age differently due to e.g. different operating temperature of each battery cell. In addition, differences in the dynamics of the individual battery cells, for example self-discharge between cells, lead to an uneven charge level distribution of the battery pack.

Overall, the state-of-charge (SOC) for the battery cells will eventually drift apart leading to an uneven state-of-charge distribution which limits the operational performance for the battery pack. In addition, the SOC status for a given battery pack may typically become more difficult to estimate during use of the battery pack in the vehicle, e.g. during charging of the battery pack or during operation of the vehicle, partly due to ageing of the battery pack.

Estimations of the SOC status of a battery pack are therefore generally associated with an estimation error which poses a challenge in using the battery pack, not only in an efficient manner, but also in a secure and endurable manner. By way of example, it has been observed that using a battery pack outside its SOC window can be detrimental to the battery pack and often unfavourable for the overall life time of the battery pack.

EP 2 502 774 A1 discloses one example of a method for estimating SOC based on temperature, current and voltage readings of one or more battery cells. Further, a charge electronic control unit (ECU) is used for controlling charging and discharging of a battery based on a determined SOC value from the SOC estimation and a control range of SOC. The SOC control range may either be a first range or a second range which is narrower than the first range.

In order to avoid using the battery pack in an unfavourable manner, many electrical vehicle systems are adapted to always use the battery pack with a significant margin to the SOC limits independent on the actual SOC accuracy. However, this reduces the energy available in the battery, and thus also reduces the vehicle range.

Thus, there remains a need for an improved control of a vehicle electrical system of a partly or fully electrical vehicle based on the SOC window of a battery pack assembly.

SUMMARY

An object of the invention is to provide a method for determining an adjusted state-of-charge (SOC) operating window of a battery pack assembly in a vehicle, thereby contributing to increasing the life time and the energy content of the battery pack assembly. The object is at least partly achieved by a method according to claim 1.

According to a first aspect of the invention, there is provided a method for determining an adjusted state-of-charge (SOC) operating window of a battery pack assembly in a vehicle. The method comprises the steps of:
  determining an energy throughput or an electrical current throughput of the battery pack assembly;
  determining a SOC operating window margin based on said determined energy throughput or electrical current throughput of the battery pack assembly, wherein a magnitude of the SOC operating window margin is a function of the determined energy throughput or electrical current throughput of the battery pack assembly; and
  adjusting the SOC operating window in response to the determined SOC operating window margin.

Accordingly, the example embodiments of the method provides for adjusting a SOC operating window of a battery pack assembly as a function of energy throughput or electrical current throughput. In this manner, the method provides for estimating the maximum operational capability of the battery pack assembly in terms of energy, which can be used as a control input to the ordinary operation of the battery pack assembly and the vehicle. To this end, the method according to the example embodiments contributes to a more healthy operation of the battery pack assembly, that typically also has a positive impact on the life time of the battery pack assembly for the given vehicle and the given application of the battery pack assembly in the vehicle.

In particular, it has been observed that there is a correlation between the energy or electrical current inflow and outflow through the battery pack assembly and the SOC status of the battery pack assembly, and to determine the SOC operating window margin in view of the determined energy or electrical current inflow and outflow through the battery pack assembly. Since the accuracy of the SOC operating window correlates to the total electrical current through the battery pack assembly, it is believed that the SOC operating window can be determined in a more accurate manner by using the total electrical current or total energy throughput as a criterion to determine the SOC operating window margins. It is to be noted that the accuracy is correlated to total electrical current because of the accuracy error accumulated at each electrical current integration, partly because the main source of error relates to the sensor accuracy. In this context, electrical current integration refers to the Coulomb counting method.

Also, it has been observed that the parameter energy throughput is a better measurement for capturing the effect of a variable or changing vehicle driving cycle than simply measuring time or travelled distance.

It should be noted that the accuracy is typically proportional to the accumulated electrical current typically because the electrical current sensor accuracy can be approximated as constant.

In particular, the method relates to a number of sequences for adjusting the SOC operating window of a high voltage battery pack assembly as a function of energy throughput or electrical current throughput. In this context, the term "high voltage" refers to a battery pack of about 400-1000 voltage (V).

The example embodiments of the method are particularly useful for vehicles such as electrical vehicles, including partly and fully electrical vehicles, hybrid electrical vehicles, plug-in hybrid electrical vehicles or any other type of electrical vehicle. This type of vehicles typically comprises an electrical engine, the battery pack assembly and the battery management unit. The battery pack assembly is configured to provide power to the electrical engine, thereby providing propulsion for the electrical, hybrid, or plug-in hybrid vehicle and/or to power any other type of electrical loads in various types of construction equipment.

In this type of vehicles, it has been observed that the battery pack assembly should typically only be used within a certain estimated SOC window, e.g. an estimated SOC window with end margins of about 20% and 60%, in order to minimize the risk of reducing the life time of the battery pack assembly. Operating a battery pack assembly outside the SOC window end margins may even damage the battery pack assembly. However, one problem when controlling a vehicle electrical system based on the SOC is that the SOC of the battery pack assembly itself may not be accurately measured. For instance, the assumed or estimated SOC of the battery pack assembly may often slowly drift due to e.g. sensor accuracy etc. Thus, when a battery pack assembly becomes discharged during use of the vehicle, and the SOC of the battery pack assembly is eventually reduced so that the SOC is close to an end margin of the SOC window, there is a risk that the actual end margins are overshot due to the real (or true) SOC being different from the estimated (or assumed) SOC.

By the example embodiments of the method, it becomes possible to mitigate the effect of an inaccurate SOC, e.g. the risk to overshoot the maximum SOC limit, by adapting the SOC operating window to the estimated SOC accuracy. It should be readily appreciated that the adapted SOC operating window may still be inaccurate compared to the true SOC status, however, the awareness and knowledge of the inaccuracy is improved, while permitting the user to adapt and possibly increase the safety margins based on the result and the given situation. This is an advantage during operation of a fully or partly electrical vehicle including a battery pack assembly or a battery management unit having an associated SOC status, which the corresponding battery pack assembly typically regards as the true level of the SOC status. However, as mentioned above, there is often a discrepancy between the assumed SOC status and the true SOC status of the battery pack assembly.

If the method according to the example embodiments is used for controlling a vehicle electrical system, as also mentioned above, the method allows for mitigating the effect of controlling the vehicle electrical system based on an inaccurate SOC, thus also increases the chances of handling potential errors between the assumed SOC status and the true SOC status during use of the battery pack assembly. To this end, the method also provides for handling possible deficiency in calibrating the SOC before or during use of the battery pack assembly.

Moreover, the example embodiments of the method allows for controlling that the SOC status of the battery management unit never exceed the end limits of the SOC window.

The example embodiments of the invention are typically implemented by using a control unit logging the energy throughput (or electrical current throughput) of the battery pack assembly over time. By way of example, the SOC operating window is first set to its optimal limits, e.g. a lower end SOC limit corresponding to 20% SOC and an upper end SOC limit corresponding to 60% SOC. When the energy throughput increases, the SOC operating window limits are made more restrictive to reflect an SOC accuracy margin. For example, the lower end SOC limit is increased to 21% and the upper end SOC limit is decreased to 59%.

In the context of the example embodiments of the invention, the term "vehicle electrical system", as used herein, typically refers to vehicle electrical components for providing energy (such as traction energy) and for storing energy (delivering and receiving energy), including, but not limited to, the following components; battery pack assembly, electrical motor(s), cable(s), sensor(s), control units, battery management unit(s) etc. In one example embodiment, the vehicle electrical system is in particular configured to deliver and receive energy for performing various vehicle operations of the vehicle.

In the context of the example embodiments of the invention, the term "state-of-charge (SOC)", as used herein, refers to the available capacity at the present status of the battery pack assembly. The SOC may also include or represent the charge level of a battery cell, a single battery pack, the battery management unit or a combination thereof. The SOC is typically determined in percentage (%) between available capacity and rated capacity of a new battery cell or electrical current capacity or a battery cell.

In electrical vehicles comprising a battery pack assembly, the SOC has several different purposes, e.g. it may be used as an input to other battery management functions, including but not limited to SOP (state-of-power), SOQ (state-of-capacity), SOR (state-of-resistance), SOE (state-of-energy), in overall vehicle energy management, in a charging strategy, as input to an life time estimator, as input to an ageing time estimator, as input when analyzing fault cases, and/or a combination thereof.

In the context of the example embodiments of the invention, the term "SOC operating window" or "state-of-charge operating window", as used herein, and also sometimes simply denoted as the "SOC window" for ease of reference, typically refers to the state-of-charge (SOC) usable window.

In the context of the example embodiments of the invention, the term "battery management unit", as used herein, typically refers to a control unit of a battery pack or a plurality of battery packs, such as the battery pack assembly. The control unit may also include a model of one battery pack or a plurality of battery packs, or a combination thereof. Thus, the battery management unit typically includes a control unit configured to control the functionality of the battery pack assembly. In other words, the battery management unit is typically a part of the vehicle electrical system.

In the context of the example embodiments of the invention, the term "energy throughput" is the integral of power over time, which may also be defined as the sum of power over time for a discrete system such as the vehicle electrical system. Further, the term "power" is the product of voltage and electrical current. Hence, the energy throughput is calculated by integrating or summing the product of electrical current and voltage over time.

In the step of determining an energy throughput or an electrical current throughput of the battery pack assembly, the energy throughput may typically be defined as the sum of inflow and outflow of power in the battery pack assembly, while the electrical current throughput may typically be defined as the sum of inflow and outflow of electrical current in the battery pack assembly.

Accordingly, the energy throughput is obtained by integrating over time the product of voltage data and electrical current data from one or a number of sensors located in the sensor unit. By way of example the sensor unit comprises two sensors in the sensor unit. Thus, if the method is configured to determine the energy throughput, the step of determining the energy throughput of the battery pack assembly involves measuring the electrical current throughput and voltage throughput of the battery pack assembly, and subsequently summing the product of the electrical current throughput with voltage throughput to receive the energy throughput. Measuring electrical current through the battery pack assembly and the voltage through the battery pack can e.g. be performed by the sensor unit.

As such, the energy inflow and energy outflow of the battery pack assembly is typically determined by calculations using corresponding electrical current inflow and electrical current outflow as input data and voltage as additional input date. Subsequently, the energy throughput is obtained by summing the product of electrical current and voltage over time.

It should be readily appreciated that the step of determining energy throughput or electrical current throughput of the battery pack assembly is typically performed over time.

According to one example, the step of adjusting the SOC operating window in response to the determined SOC operating window margin is performed by increasing a lower end limit of the SOC operating window by the determined SOC operating window margin.

In addition, or alternatively, the step of adjusting the SOC operating window in response to the determined SOC operating window margin is performed by decreasing an upper end limit of the SOC operating window by the determined SOC operating window margin.

In this manner, it becomes possible to prevent that the battery pack assembly overshoot its maximum window limits, thus further improving the lifetime of the battery pack assembly.

In addition, or alternatively, the step of adjusting the SOC operating window in response to the determined SOC operating window margin is performed to form an asymmetrical adjusted SOC operating window or a symmetrical adjusted SOC operating window. Performing the asymmetrical adjustment of the SOC operating window is useful as it might be less critical to overshoot the low SOC than the high SOC (or vice-versa). Thus, in order to optimize the energy content, while not making overly and unnecessary adaptations of the SOC operating window, it may be useful in some occasions only to decrease the lower end SOC limit, while maintaining the upper end SOC limit, thus forming an asymmetrical adjusted SOC operating window. The symmetrical adjusted SOC operating window typically corresponds to the basic approach of adjusting an SOC operating window, i.e. adjusting the upper end limit and the lower end limit of the SOC operating window with an equal magnitude.

According to one example embodiment, the method further comprises the step of controlling the vehicle electrical system so that the SOC of the battery pack assembly remains within the adjusted SOC operating window. The vehicle electrical system can be controlled in several different manners depending on type of vehicle and type of application of the vehicle. By way of example, an electric machine of the vehicle can be controlled based on the step adjusted SOC operating window. Hence, in one example embodiment, the step of controlling the vehicle electrical system so that the SOC of the battery pack assembly remains within the adjusted SOC operating window is performed by controlling any one of the torque and speed of an electric machine of the vehicle. The electric machine is typically one of the propulsion electric machines of the vehicle.

Typically, the step of controlling any one of the torque and speed of an electric machine of the vehicle is performed so that the electrical current flowing in and out of the battery pack assembly maintains the SOC of the battery pack assembly within the adjusted SOC operating window.

Typically, although not strictly required, the method may further comprise the step of receiving a signal from a battery management unit comprising data indicative of the SOC of the battery pack assembly. The step of receiving a signal from a battery management unit comprising data indicative of the SOC of the battery pack assembly may generally be performed prior to the step of determining the energy throughput or electrical current throughput of the battery pack assembly. In addition, the step of receiving a signal from a battery management unit comprising data indicative of the SOC of the battery pack assembly may generally be performed prior to the step of controlling the vehicle electrical system so that the SOC of the battery pack assembly remains within the adjusted SOC operating window.

According to one example embodiment, the method further comprises the step of resetting the determined energy throughput or electrical current throughput of the battery pack assembly and resetting the determined SOC operating window margins to a default SOC operating window margins.

Typically, although not strictly required, the step of resetting the determined energy throughput or electrical current throughput of the battery pack assembly and resetting the determined SOC operating window margin to a default SOC operating window margin is performed subsequently to a SOC re-calibration operation. In this manner, the re-calibration of the SOC can be performed in a more accurate manner.

The step of determining the energy throughput or electrical current throughput of the battery pack assembly can be initiated in several different manners. Generally, the step of determining the energy throughput or electrical current throughput of the battery pack assembly may be initiated by a control signal from a battery management unit. By way of example, the step of determining the energy throughput or electrical current throughput of the battery pack assembly is performed in response to an indication that the contactors of the battery pack assembly are in a closed state, i.e. the battery pack assembly is ready to deliver and receive electrical energy. According to one example embodiment, the step of determining the energy throughput or electrical current throughput of the battery is initiated by receiving an indication from the battery pack assembly to monitor inflow of energy or electrical current of the battery pack assembly and outflow of energy or electrical current of the battery pack assembly. The indication from battery pack assembly is typically received at the control unit. In addition, or alternatively, the indication from battery pack assembly is typically received at the battery management unit. The indication typically refers to data indicating that the contactors of the battery pack assembly are in a closed state. However, it should also be readily appreciated that the method may be performed in a continuous manner during operation of the vehicle.

According to one example embodiment, the step of determining the energy throughput or electrical current throughput of the battery pack assembly is performed by measuring the inflow of energy or electrical current at an electrical current inflow of the battery pack assembly and an outflow of energy or electrical current at an electrical current outflow of the battery pack assembly.

By way of example, the above-mentioned step, i.e. the step of determining the energy throughput or electrical current throughput of the battery pack assembly, is performed by arranging a measuring sensor configured to measure the inflow of energy or electrical current at the electrical current inflow of the battery pack and the outflow of energy or electrical current at the electrical current outflow of the battery pack.

According to one example embodiment, the electrical vehicle system comprises the measuring sensor unit configured to measure electrical current in ampere. The measuring sensor unit may be any other sensor unit capable of measuring the inflow and outflow of electrical current through the battery pack assembly. These types of sensor units are commonly available and several different options are conceivable.

In addition, or alternatively, the measuring sensor unit may be a voltage sensor configured to measure and calculate the energy throughput. That is, the energy throughput is calculated by integrating or summing the product of electrical current and voltage over time.

It is to be noted that the battery pack assembly can refer to one or several number of battery pack(s). In addition, it is to be noted that the battery pack assembly can include different types of batteries. By way of example, any one of the batteries in the battery pack assembly is any one of a lithium-ion battery or sodium-ion battery. A sodium-ion battery typically includes any type of sodium iron battery or sodium ferrite battery.

As mentioned above, the example embodiments of the method and the sequences of the methods, typically corresponding to the steps of the method, are executed by a control unit. Thus, according to one example embodiment, the steps of the method are performed by a control unit, typically during use of the battery pack assembly by the electrical vehicle system.

The method may be continuously running as long as the vehicle is operative, but also continuously running when the vehicle is non-operative and the battery pack assembly is used, e.g. during a charging operation. Accordingly, the phrase "during use of the battery pack assembly" may refer to both charging of the battery pack assembly, and using the battery pack assembly during operation of the vehicle, e.g. driving of the vehicle.

Optionally, the method may also include the step of resetting the SOC status of the battery pack assembly and the SOC operating window to a SOC default state and a SOC default operating window with default upper end limit and default lower limit prior to the step of receiving the signal from the battery management unit comprising data indicative of the SOC of the battery pack assembly. The step of resetting the SOC status of the battery pack assembly and the SOC operating window to a SOC default state and a SOC default operating window may be useful when installing a new battery pack in the battery pack assembly. The step of resetting the battery pack assembly to SOC default margin may also be useful when initiating the method for the first time in a vehicle.

According to one example embodiment the battery management unit comprises the control unit and an electronic storage unit. Further, in one example embodiment, the battery management unit corresponds to the control unit. The battery management unit is arranged in communication with the battery pack assembly. In addition, or alternatively, the control unit is arranged in communication with the battery pack assembly. Further, the control unit is comprised with the vehicle. Accordingly, the battery management unit is comprised with the vehicle.

Moreover, there is provided a control unit configured to perform any one of the steps of any one of the example embodiments of the method as mentioned above in relation to the first aspect. Effects and features of the second aspect of the invention are largely analogous to those described above in connection with the first aspect.

Also, there is provided a vehicle, such as a fully or hybrid electrical vehicle, comprising a battery pack assembly and a control unit according to the second aspect above. The vehicle may be an electrical, hybrid, or plug-in hybrid vehicle comprising an electrical engine, wherein the battery pack assembly provides power to the electrical engine for providing propulsion for the electrical, hybrid, or plug-in hybrid vehicle. It is to be noted that the vehicle can therefore be either a partly of fully electrical vehicle.

Furthermore, there is provided a computer program comprising program code means for performing the steps of any of the embodiments of the first aspect when the program is run on a computer.

Furthermore, there is provided a computer readable medium carrying a computer program comprising program code means for performing the steps of any of the embodiments of the first aspect when the program product is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

Figure 1:
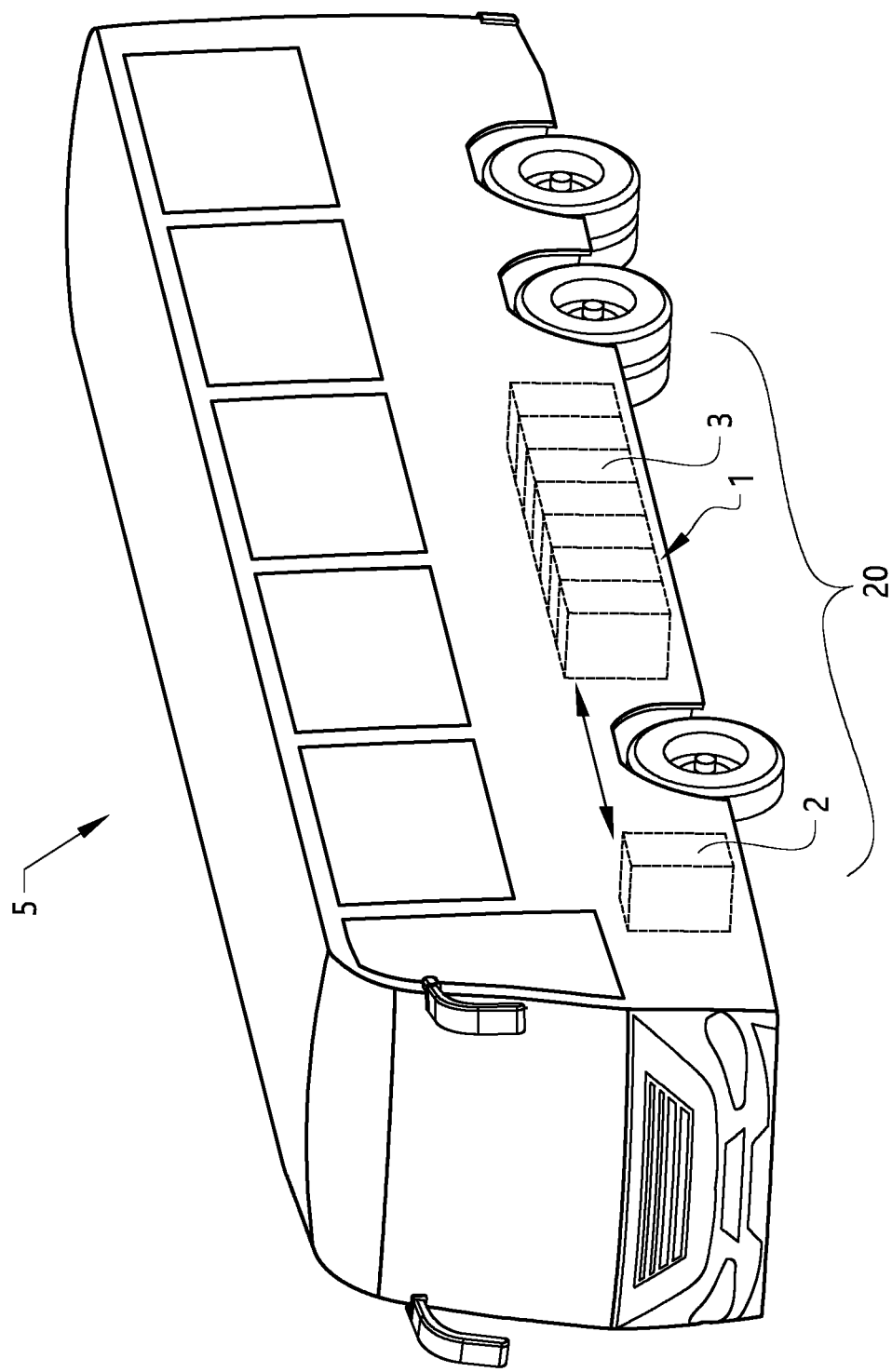
FIG. 1 is a side view of vehicle in the form an electrical bus according to example embodiments of the invention.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of an electrical bus 5 comprising a battery pack assembly 1. The battery pack assembly here comprises a number of battery packs. Each one of the battery packs comprises a plurality of battery cells 3. The battery pack assembly 1 is arranged to provide power to an electrical engine (not shown) arranged for providing propulsion for the electrical bus 5. The electrical bus 5 further comprises a battery management unit 2 which is configured to control and monitor the battery pack assembly. In this example, the battery management unit 2 is arranged to control a method according to the example embodiments, as described in relation to FIG. 3. The battery management unit 2 is further configured to monitor battery cell characteristics such as state of charge (SOC) and open circuit voltage of the battery cells 3. Other functions of the battery management unit may relate to safety functions, such as state-of-power, and/or closing the contactors.

Figure 2:
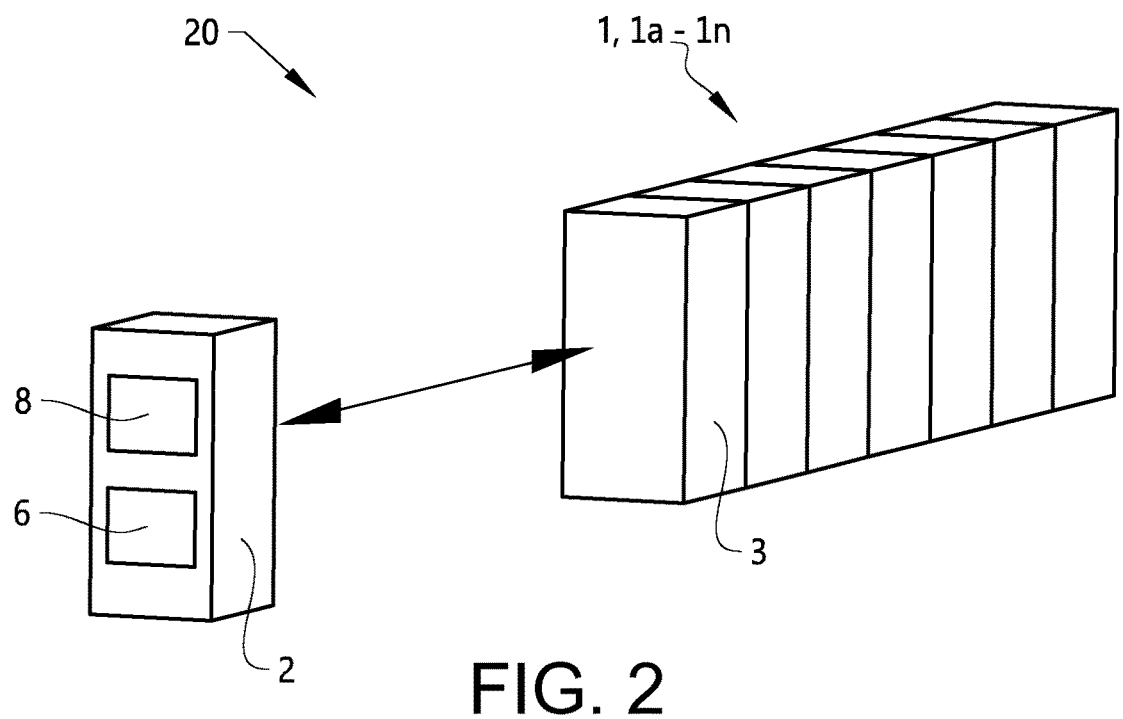
FIG. 2 schematically illustrates parts of a vehicle electrical system according to example embodiments of the invention.

FIG. 2 schematically illustrates parts of a vehicle electrical system according to example embodiments of the invention. The vehicle electrical system 20 can be incorporated and installed in a vehicle as mentioned above in relation to FIG. 1, or in any other type of partly or fully electrical vehicle.

The vehicle electrical system 20 is adapted to manage the electronic functions of the vehicle, including, but not limited to providing electrical power to a propulsion system (not shown).

The vehicle electrical system 20 comprises the battery management unit 2, the battery pack assembly 1, a sensor unit 6 for measuring electrical current inflow and outflow of the battery pack assembly 1, and a control unit 8 for determining a SOC operating window of the battery pack assembly. The battery pack assembly includes in this example a number of battery packs 1a-1n, each one of them comprising a number of battery cells 3. In FIG. 2, the battery pack assembly comprises seven battery packs. The number of battery packs in the battery pack assembly and the number of battery cells varies depending on type of vehicle and type of installation, etc. One example of a suitable battery pack is a lithium-ion battery.

Furthermore, the sensor unit 6 is in FIG. 2 illustrated to be arranged in the battery management unit 2. However, depending on sensor configuration and technology, the sensor unit or parts of the sensor units can likewise be arranged adjacent or at the battery pack assembly. The sensor unit should at least be configured to communicate with the control unit 8, i.e. to transmit data relating to relevant measurements as mentioned herein. The sensor unit 6 is here an electrical current sensor configured to measure electrical current in ampere, or any other sensor capable of measuring the inflow and outflow of electrical current through a battery. These types of sensor units are commonly available and several different options are conceivable. Also, the sensor unit may be a voltage sensor configured to calculate the energy throughput. In this context, the term "energy throughput" is the integral of power over time, which may also be defined as the sum of power over time for a discrete system such as the vehicle electrical system. Further, the term "power" is the product of voltage and electrical current. That is, the energy throughput is calculated by integrating or summing the product of electrical current and voltage over time.

The control unit 8 is arranged in communication with the battery pack assembly. The control unit 8 of the battery management unit 2 may include a microprocessor, microcontroller, programmable digital signal processor or another programmable device. Thus, the control unit of the battery management unit 2 comprises electronic circuits and connections (not shown) as well as processing circuitry (not shown) such that the battery management unit 2 can communicate with different parts of the vehicle such as the brakes, suspension, driveline, in particular an electrical engine, an electric machine, a clutch, and a gearbox in order to at least partly operate the bus 1. The battery management unit 2 may comprise modules in either hardware or software, or partially in hardware or software and communicate using known transmission buses such as CAN-bus and/or wireless communication capabilities. The processing circuitry may be a general purpose processor or a specific processor. The battery management unit 2 comprises a non-transistory memory for storing computer program code and data upon. Thus, the battery management unit 2 may be embodied by many different constructions.

While the example embodiment described above includes a control unit being an integral part of the battery management unit, it is also possible that the control unit may be a separate part of the vehicle electrical system or the like.

The control unit 8 is configured to estimate a SOC for each one of the battery pack. However, the control unit is typically configured to estimate the SOC for the entire battery pack assembly 1.

Typically, the sensor unit 6 is arranged to provide a measurement of at least one parameter which reflects the electrical current inflow and electrical current outflow of the battery pack assembly. For example, there is provided a measurement of the electrical current inflow I-IN and a measurement of the electrical current outflow I-OUT of each battery pack 1a to 1n of the battery pack assembly by means of the sensor unit. For this reason, each battery pack of the battery pack assembly is operatively connected to the sensor unit in order to permit the sensor unit to gather the relevant data regarding electrical current inflow and electrical current outflow. In addition, or alternatively, the sensor unit is configured to measure the electrical current inflow I-IN and to measure the electrical current outflow I-OUT of the battery pack assembly 1.

The data relating to the electrical current inflow and electrical current outflow is transmitted to the control unit 8 for further processing. Hence, the control unit is arranged in communication with the senor unit.

Alternatively, there is provided a measurement of the energy inflow E-IN and a measurement of the energy outflow E-OUT of each battery pack of the battery pack assembly by means of the sensor unit. In this example, the sensor unit is typically a voltage sensor, as mentioned above. For this reason, each battery pack of the battery pack assembly is operatively connected to the sensor unit in order to permit the sensor unit to gather the relevant data regarding energy inflow and energy outflow. In addition, or alternatively, the sensor unit is configured to measure the energy inflow E-IN and to measure the energy outflow I-OUT of the battery pack assembly.

The data relating to the energy inflow and electrical current outflow is transmitted to the control unit 8 for further processing. Hence, the control unit is arranged in communication with the senor unit. Alternatively, the energy throughput is determined in the sensor unit based on the measured data, as mentioned above, and subsequently transmitted to the control unit.

Accordingly, the sensor unit 6 is operatively connected to the control unit. The communication between the sensor unit 6 and the control unit 8 can be made by a wire connection, wireless or by any other technology such as Bluetooth or the like.

The control unit may also be configured for processing other parameters than the electrical current inflow and electrical current outflow. For instance, the control unit may be configured for processing energy inflow and energy outflow of the battery pack assembly. Both types of these parameters can be used for determining the SOC operating window as described herein.

However, the energy inflow and energy outflow of the battery pack assembly is typically determined by calculations using corresponding electrical current inflow and electrical current outflow as input data and voltage as additional input date. Subsequently, the energy throughput is obtained by summing the product of electrical current and voltage over time.

In addition, the SOC operating window may be determined by e.g. an algorithm running on e.g. the control unit 8. The algorithm is typically stored in the control unit.

The SOC algorithm typically estimates the level of charge at the present moment of the battery pack assembly. Further, the SOC algorithm may reflect the amount of remaining capacity, Qact, (Ah) of the battery pack assembly, at the present moment of the calculation, compared to the rated nominal capacity Qbatt (Ah), at the present age of the calculation. The SOC algorithm should be presented in percentage.

By way of example, the control unit is configured to determine the SOC based on the algorithm:

$$SOC = \frac{Q_{act}}{Q_{batt}} \times 100 \quad \text{(Eq. 1)}$$

wherein
SOC is the level of charge at the present moment of the battery pack assembly;
$Q_{act}$ is the amount of remaining capacity of the battery pack assembly; and
$Q_{batt}$ is the rated nominal capacity at the present age of the calculation In addition, the control unit is configured to determine the SOC operating window based on another algorithm. By way of example, the control unit is configured to determine the SOC operating window based on the algorithm:

$$SOC_{margin} = K \times \text{Energy Throughput} \quad \text{(Eq. 2)}$$

wherein
K is a constant parameter;
$SOC_{margin}$ is the SOC window margin in percentage; and
Energy Throughput is the energy throughput of the battery pack assembly as determined in Eq. 5 below.

From the Equation 2, it is then possible to determine a SOC window upper end limit and a SOC window lower end limit, in which:

$$SOC_{window, upper\ end\ limit} = SOC_{window, upper\ end\ limit, default} - SOC_{margin} \quad \text{(Eq. 3)}$$

$$SOC_{window, lower\ end\ limit} = SOC_{window, lower\ end\ limit, default} + SOC_{margin} \quad \text{(Eq. 4)}$$

wherein
$SOC_{window, lower\ end\ limit, default}$ is a constant parameter reflecting the default value of the SOC window lower end limit; and
$SOC_{window, upper\ end\ limit, default}$ is a constant parameter reflecting the default value of the SOC window upper end limit.

The constant parameters K, $SOC_{window, lower\ end\ limit, default}$ and $SOC_{window, upper\ end\ limit, default}$ are typically predetermined parameters stored in the control unit.

The control unit optionally also includes a function that estimates the SOC diversion between battery packs in the battery pack assembly in the vehicle electrical system in order to ensure that proper actions can be activated and initiated. One example of proper action relates to ensure SOC equalization between the battery packs.

Figure 3:
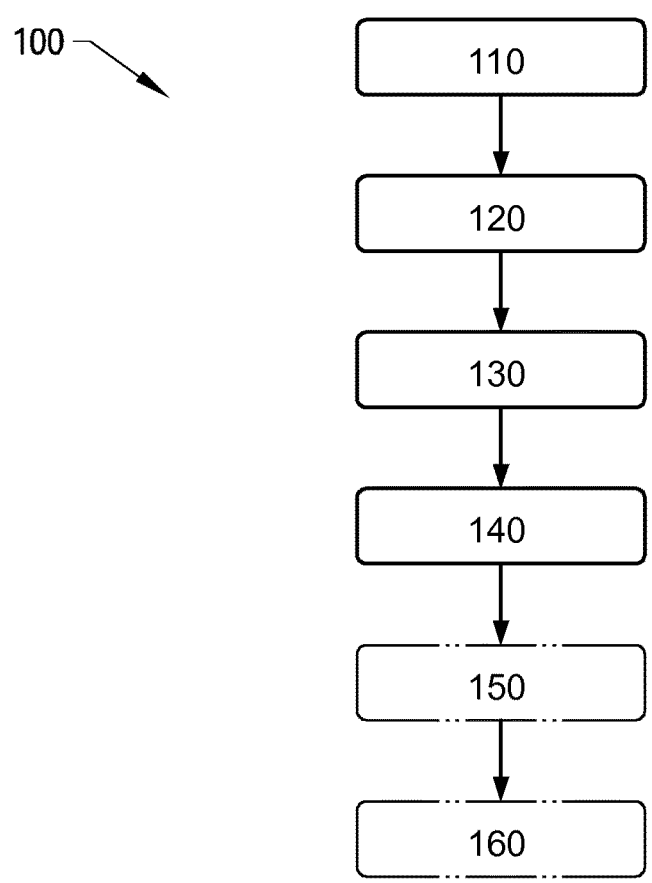
FIG. 3 is a flow-chart of method steps according to example embodiments of the invention.

Turning now to FIG. 3, there is depicted a flowchart of a method according to example embodiments of the invention. The method is intended for determining an adjusted SOC operating window of a battery pack assembly in a vehicle. By way of example, the method is intended for controlling a vehicle electrical system as mentioned above in relation to FIGS. 1 and 2 by the adjusted SOC operating window of a battery pack assembly in a vehicle. The sequences of the method are generally performed by the sensor unit 6 and the control unit 8, as described above in relation to the FIGS. 1 and 2. However, the sequences of the method may likewise be performed by other types of components and by other technologies as long as the method can provide the associated functions and effects.

Thus, while referring to FIG. 3, there is depicted a method 100 of determining an adjusted SOC operating window of a battery pack assembly in a vehicle. The method according to this example embodiment comprises the steps of:
determining 120 an energy throughput or an electrical current throughput of the battery pack assembly, defined as the sum of inflow and outflow of power or the sum of inflow and outflow of electrical current in the battery pack assembly, respectively;

determining 130 a SOC operating window margin based on the determined energy throughput or electrical current throughput of the battery pack assembly;

adjusting 140 the SOC operating window in response to the determined SOC operating window margin.

In line with the example embodiments of the method, a magnitude of the SOC operating window margin is here a function of the determined energy throughput or electrical current throughput of the battery pack assembly, which is further described in relation to FIGS. 4 and 5 below.

In one example, when the method is intended for controlling a vehicle electrical system by the adjusted SOC operating window, the method may optional comprises the step of receiving 110 a signal from the battery management unit comprising data indicative of the SOC of the battery pack assembly.

Typically, although strictly not necessary, the method further comprises the step of controlling 150 the vehicle electrical system so that the SOC of the battery pack assembly remains within the adjusted SOC operating window. By way of example, the step 150 is achieved by controlling the torque and speed of the propulsion electric machine in such a way that the current flowing in and out of the battery keeps the battery SOC within the battery SOC operating window.

It should be readily appreciated that the step 110 of receiving the signal from the battery management unit comprising data indicative of the SOC status of the battery pack assembly typically refers to an estimated SOC status of the battery pack assembly. The estimated SOC status typically refers to a SOC status value in percentage (%).

The step of determining the energy throughput or electrical current throughput of the battery pack assembly can be initiated in several different manners. In this example, the step of determining the energy throughput or electrical current throughput of the battery pack assembly is performed in response to an indication that the contactors of the battery pack assembly are in a closed state, i.e. the battery pack assembly is ready to deliver and receive electrical energy. The state of the contactors can be monitored by a sensor or the like, as is commonly known in the art. The indication from battery pack assembly is typically received at the control unit. The indication is here data indicating that the contactors of the battery pack assembly are in a closed state.

The step 120 of determining the energy throughput or electrical current throughput of the battery is performed by measuring the inflow of energy or electrical current at an electrical current inflow of the battery pack assembly and an outflow of energy or electrical current at an electrical current outflow of the battery pack assembly.

By way of example, the step 120 is performed by arranging a measuring sensor unit configured to measure the inflow of energy or electrical current at the electrical current inflow of the battery pack and the outflow of energy or electrical current at the electrical current outflow of the battery pack. The sensor unit here refers to sensor unit 6 in e.g. FIG. 2.

Further, if the method is configured to determine the energy throughput in step 120, the step 120 typically involves calculating the energy throughput by the formula:

$$\text{Energy Throughput} = \Sigma(\text{Voltage} \times \text{Current}) \quad \text{(Eq. 5)}$$

wherein

Energy Throughput is the energy throughput of the battery pack assembly;

Voltage is the voltage through the battery pack assembly; and

Current is the electrical current through the battery pack assembly.

Typically, although not strictly required, the energy throughput is obtained by integrating over time the product of voltage data and electrical current data from two sensors located in the sensor unit 6, as mentioned above. Thus, if the method is configured to determine the energy throughput in step 120, the step 120 typically involves measuring the electrical current throughput and voltage throughput of the battery pack assembly, and subsequently summing the product of the electrical current throughput with voltage throughput to receive the energy throughput. Measuring electrical current through the battery pack assembly and the voltage through the battery pack assembly can e.g. be performed by the sensor unit 6, as mentioned above in relation to FIG. 2. Thus, the sensor unit is configured to measure the electrical current through the battery pack assembly and the voltage through the battery pack assembly. Subsequently, the sensor unit is configured to calculate the energy through the battery pack assembly as mentioned above by using the data relating to the electrical current through the battery pack assembly and the voltage through the battery pack assembly.

On the other hand, if the method is configured to determine the electrical current throughput in step 120, the step 120 typically involves measuring the electrical current throughput of the battery pack assembly. Measuring electrical current through the battery pack assembly can e.g. be performed by the sensor unit 6, as mentioned above in relation to FIG. 2. Thus, the sensor unit is here configured to measure the electrical current through the battery pack assembly.

The data relating to energy throughput or electrical current throughput of the battery pack assembly is generally transmitted to the control unit in sequences rather than continuously. However, both alternatives are conceivable depending on the type of vehicle electrical system and configuration.

In step 130, i.e. to determine the SOC operating window margin based on the determined energy throughput or electrical current throughput of the battery pack assembly, the control unit is configured to determine the SOC operating window based on the algorithm in Equation 2, as mentioned above.

When the SOC operating window margin is determined based on the determined energy throughput or the electrical current throughput of the battery pack assembly, the method typically continues to step 140.

In the step 140, the method adjusts the SOC operating window in response to the determined SOC operating window margin from step 130. The step 140 of adjusting the SOC operating window in response to the determined SOC operating window margin is in this example performed by increasing the lower end limit of the SOC operating window by the determined SOC operating window margin. In addition, or alternatively, the step 140 of adjusting the SOC operating window in response to the determined SOC operating window margin is performed by decreasing the upper end limit of the SOC operating window by the determined SOC operating window margin. Each one of these two alternatives typically forms an asymmetrical adjusted SOC operating window.

However, in order to form a symmetrical adjusted SOC operating window, the step 140 of adjusting the SOC operating window in response to the determined SOC window margin is often performed by increasing the lower end limit of the SOC operating window by the determined SOC window margin and by decreasing the upper end limit of the SOC operating window by the determined SOC window margin.

By way of example, the SOC operating window is optionally first set to its optimal limits, e.g. a lower end SOC limit corresponding to 20% SOC and an upper end SOC limit corresponding to 60% SOC. When the energy throughput increases, the SOC operating window limits are made more restrictive to reflect an SOC accuracy margin. For example, the lower end SOC limit is increased to 21% and the upper end SOC limit is decreased to 59%.

By way of example, the lower end limit of the SOC operating window can be increased with the Equation 4, as mentioned above. For example, the lower end SOC limit is increased from 20% to 21%.

In addition, by way of example, the upper end limit of the SOC operating window can be decreased with the Equation 3, as mentioned above. For example, the upper end SOC limit is decreased from 60% to 59%.

Moreover, the step 140 of adjusting the SOC operating window in response to the determined SOC window margin can be performed to form the asymmetrical adjusted SOC operating window or the symmetrical adjusted SOC operating window. Performing the asymmetrical adjustment of the SOC operating window is useful as it might be less critical to overshoot the low SOC than the high SOC (or vice-versa). Thus, in order to optimize the energy content, while not making overly and unnecessary adaptations of the SOC operating window, it may be useful in some occasions only to decrease the lower end SOC limit, while maintaining the upper end SOC limit, thus forming an asymmetrical adjusted SOC operating window. The symmetrical adjusted SOC operating window typically corresponds to the basic approach of adjusting an SOC operating window, i.e. equally adjusting the upper end limit and the lower end limit of the SOC operating window with an equal magnitude.

Figure 4:
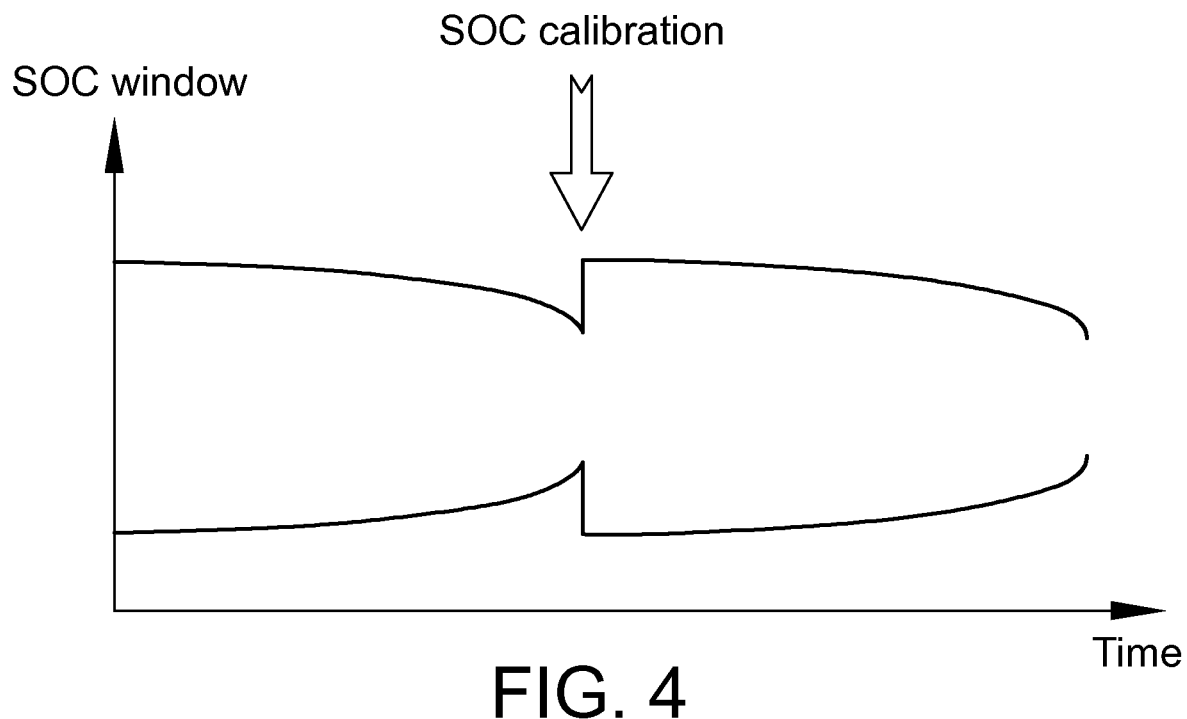
FIG. 4 schematically illustrates a state of charge (SOC) operating window for a battery pack assembly versus time.
Figure 5:
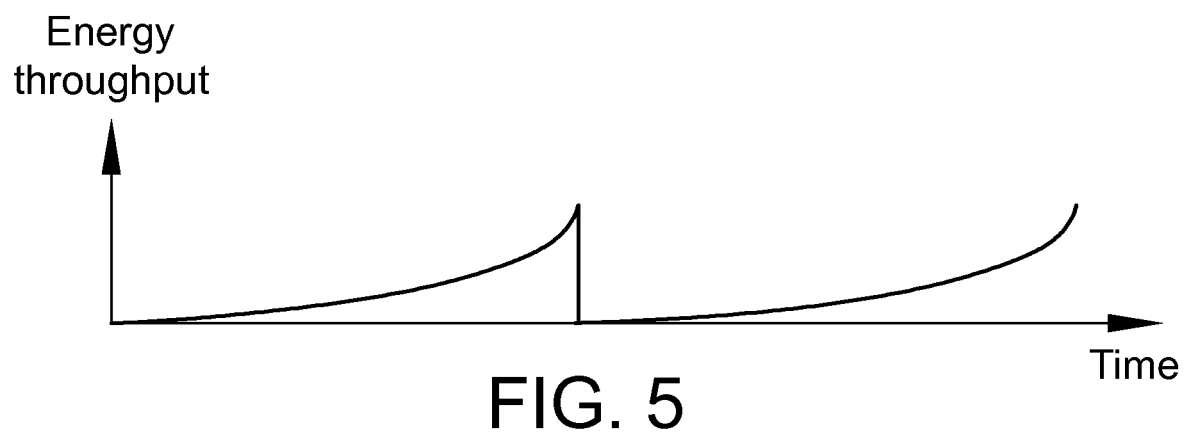
FIG. 5 schematically illustrates energy throughput for a battery pack assembly versus time.

As may be gleaned from FIGS. 4 and 5, a magnitude of the SOC operating window margin is proportional to (i.e. a function of) the determined energy throughput or electrical current throughput of the battery pack assembly. That is, the FIGS. 4 and 5 illustrate the correlation between the energy throughput and the SOC operating window, and the time axis in FIGS. 4 and 5 corresponds to each other.

FIG. 4 schematically illustrates state of charge (SOC) operating window for a battery pack assembly versus time. As illustrated, the SOC operating window limits (both upper end limit and lower end limit) are not constant over a vehicle drive cycle, but are dependent on the energy through or electrical current through the battery pack. Further, the SOC operating window limits are made more restrictive when the energy throughput increases. It can also be seen that the SOC operating window limits are reset to their original default values when a SOC calibration is performed.

FIG. 5 schematically illustrates energy throughput for a battery pack assembly versus time. As illustrated, the energy throughput increases with battery usage. However, the increase rate is not constant as it depends on the power flowing through the battery. It can also be seen that the energy throughput calculation is reset to zero when a SOC calibration is performed.

Optionally, as illustrated in FIG. 3, the method further comprises the step 160 of resetting the determined energy throughput or electrical current throughput of the battery pack assembly. In addition, or alternatively, the method in this step 160 also includes the step of resetting the determined SOC window margin to a default SOC window margin. The step of resetting the determined energy throughput or electrical current throughput of the battery pack assembly and resetting the determined SOC window margin to a default SOC window margin is performed subsequently to a SOC re-calibration operation.

A SOC calibration or a SOC re-calibration operation typically includes the step of determining the SOC of the battery pack assembly. Determining the SOC of the battery pack assembly can be obtained in several different manners. One example of determining the SOC of the battery will now be described in relation to FIG. 6, which illustrates a cell model comprising an equivalent circuit of a battery cell. The exemplary equivalent circuit model 200 comprises a single RC circuit to model the battery cell. The exemplary RC based equivalent circuit model is used for determining a state charge level of a battery cell, such as the state of charge (SOC) level of the battery cell 3a, and is typically implemented by the above mentioned control unit so as to handle deviations between model and real world voltage responses to electrical current. The characterization of the battery cell may be calculated by real-time parameter estimation approaches on battery models using direct battery measurements. The battery cell charge state estimation may for example be based on measured battery electrical current inputs and a battery terminal voltage.

Figure 6:
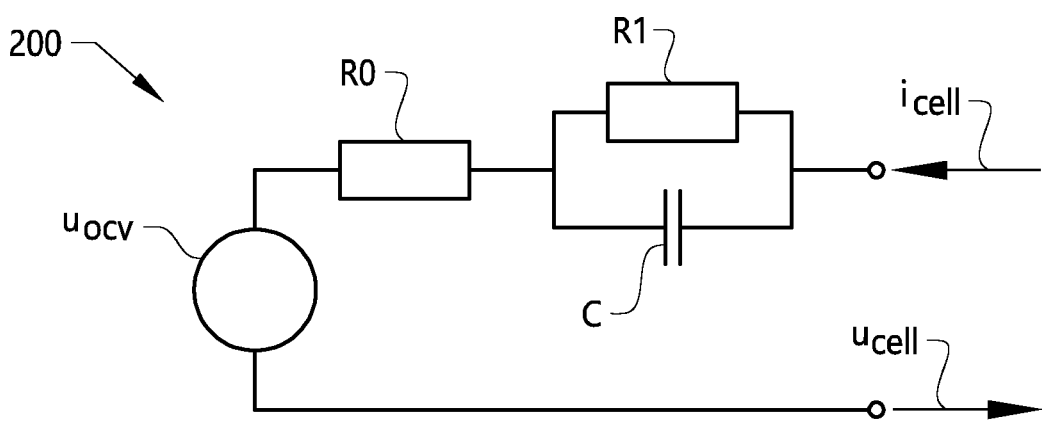
FIG. 6 schematically illustrates parts of a cell model describing a battery cell according to example embodiments of the invention.

The equivalent circuit model described in relation to FIG. 6 consists of an active electrolyte resistance (or internal resistance) R0, in series with the parallel capacitance C, and a polarization resistance (or internal resistance) R1. u_cell refers to battery cell terminal voltage output, i_cell refers to the electrical current in the circuit and u_OCV refers to the battery open circuit voltage. For given values of the terms u_OCV, R0, R1 and C, the terminal voltage u_cell can be expressed as a function of the electrical current i_cell. Normally R0 and R1 increases by age, while battery cell capacity (not illustrated in the figure) decreases by age.

By the equivalent circuit model of the battery cell 3a, it becomes possible to determine a state charge level of a battery cell. As such, it is possible to monitor the state charge level of a battery cell of the battery system. Typically, the SOC of a battery cell is estimated and determined based on the battery system open circuit voltage (OCV), which in FIG. 6 is indicated with $u_{OCV}$. Determining battery cell SOC by OCV is commonly known in the art, and is typically performed by measuring the OCV of the battery cell. The OCV of a battery cell is determined by measuring the terminal voltage output $u_{cell}$ of the battery cell when the cell is disconnected from any external load and no external electric electrical current flows through the cell, and any internal capacitor has discharged. The OCV is in direct correlation with the SOC of the battery cell, thus the method above is suitable for measuring and determining the SOC of the battery cell and the battery system.

Optionally, the method further comprises the step of resetting the SOC status of the battery pack assembly and the SOC operating window to a SOC default state and a SOC default window, with a default upper end limit and a default lower limit prior to the step 110 of receiving the signal from the battery management unit comprising data indicative of the SOC of the battery pack assembly. The step of resetting the SOC status of the battery pack assembly and the SOC operating window to a SOC default state and a SOC default window may be useful when installing a new battery pack in the battery pack assembly. The step of resetting the battery pack assembly to SOC default margin may also be useful when initiating the method for the first time in a vehicle.

In all example embodiments as described herein, or in any other example embodiment, the battery pack is any one of a lithium-ion battery or sodium-ion battery.

In all example embodiments as described herein, or in any other example embodiment, the steps of the method are typically performed by the control unit during use of the battery pack assembly by the electrical vehicle system. Thus, the control unit is configured to perform any one of the steps of any one of the example embodiments as described above in relation to the FIGS. 1-6.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electrical vehicle.

The invention claimed is:

1. A method for determining an adjusted state-of-charge (SOC) operating window of a battery pack assembly in a vehicle, the method comprising the steps of:
measuring electrical current inflow and outflow of the battery pack assembly with a sensor unit;
determining an energy throughput or an electrical current throughput of the battery pack assembly using the electrical current inflow and outflow of the battery pack assembly measured by the sensor unit; determining a SOC operating window margin with a control unit, based on said determined energy throughput or electrical current throughput of the battery pack assembly, wherein a magnitude of the SOC operating window margin is a function of the determined energy throughput or electrical current throughput of the battery pack assembly; and adjusting the SOC operating window in response to the determined SOC operating window margin.

2. The method according to claim 1, wherein the step of adjusting the SOC operating window in response to the determined SOC operating window margin is performed by increasing a lower end limit of the SOC operating window by said determined SOC operating window margin and/or decreasing an upper end limit of the SOC operating window by said determined SOC operating window margin.

3. The method according to claim 2, wherein the step of adjusting the SOC operating window in response to the determined SOC operating window margin is performed to form an asymmetrical adjusted SOC operating window or a symmetrical adjusted SOC operating window.

4. The method according to claim 1, further comprising the step of controlling the vehicle electrical system so that the SOC of the battery pack assembly remains within the adjusted SOC operating window.

5. The method according to claim 4, further comprising the step of receiving a signal from a battery management unit comprising data indicative of the SOC of the battery pack assembly.

6. The method according to claim 1, further comprising the step of resetting the determined energy throughput or electrical current throughput of the battery pack assembly and resetting the determined SOC operating window margin to a default SOC operating window margin.

7. The method according to claim 6, wherein the step is performed subsequently to a SOC re-calibration operation.

8. The method according to claim 1, wherein the step of determining the energy throughput or electrical current throughput of the battery is initiated by receiving, at the control unit, an indication from the battery pack assembly to monitor inflow of energy or electrical current of the battery pack assembly and outflow of energy or electrical current of the battery pack assembly.

9. The method according to claim 1, wherein the step of determining the energy throughput or electrical current throughput of the battery is performed by measuring the inflow of energy or electrical current at an electrical current inflow of the battery pack assembly and an outflow of energy or electrical current at an electrical current outflow of the battery pack assembly.

10. The method according to claim 9, wherein the step is performed by arranging a measuring sensor configured to measure the inflow of energy or electrical current at the electrical current inflow of the battery pack and the outflow of energy or electrical current at the electrical current outflow of the battery pack.

11. The method according to claim 1, in which the battery pack assembly comprises any one of a lithium-ion battery or sodium-ion battery.

12. The method according to claim 1, in which the steps of the method is performed by a control unit.

13. An apparatus for determining an adjusted state-of-charge (SOC) operating window of a battery pack assembly in a vehicle, comprising:

a memory operable to store computer-readable instructions; and a processor operable to read the computer-readable instructions, the processor when executing the computer-readable instructions is configured to:
   measure electrical current inflow and outflow of the battery pack assembly with a sensor unit
   determine an energy throughput or an electrical current throughput of the battery pack assembly using the electrical current inflow and outflow of the battery pack assembly measured by the sensor unit;
   determine a SOC operating window margin with a control unit, based on said determined energy throughput or electrical current throughput of the battery pack assembly, wherein a magnitude of the SOC operating window margin is a function of the determined energy throughput or electrical current throughput of the battery pack assembly; and
   adjust the SOC operating window in response to the determined SOC operating window margin.

14. A non-transitory computer readable medium carrying a computer program comprising program means for performing the steps of claim 1 when said program means is run on a computer.

15. A control unit for determine an adjusted state-of-charge (SOC) operating window of a battery pack assembly in a vehicle, the control unit being configured to:
   measure electrical current inflow and outflow of the battery pack assembly with a sensor unit:
   determine an energy throughput or an electrical current throughput of the battery pack assembly using the electrical current inflow and outflow of the battery pack assembly measured by the sensor unit
   determine a SOC operating window margin with a control unit, based on said determined energy throughput or electrical current throughput of the battery pack assembly, wherein a magnitude of the SOC operating window margin is a function of the determined energy throughput or electrical current throughput of the battery pack assembly; and
   adjust the SOC operating window in response to the determined SOC operating window margin.

16. A vehicle, comprising a battery pack assembly and a control unit according to claim 15.

\* \* \* \* \*